United States Patent
Agostini (10) Patent No.: US 12,418,906 B2
(45) Date of Patent: Sep. 16, 2025

(54) SYSTEM AND METHOD FOR GPU-INITIATED COMMUNICATION

(71) Applicant: NVIDIA CORPORATION, Santa Clara, CA (US)

(72) Inventor: Elena Agostini, Rome (IT)

(73) Assignee: NVIDIA CORPORATION, Santa Clara, CA (US)

( * ) Notice: Subject to any disclaimer, the term of this patent is extended or adjusted under 35 U.S.C. 154(b) by 427 days.

(21) Appl. No.: 17/854,570

(22) Filed: Jun. 30, 2022

(65) Prior Publication Data
US 2023/0276422 A1 Aug. 31, 2023

Related U.S. Application Data (60) Provisional application No. 63/314,420, filed on Feb. 27, 2022.

(51) Int. Cl.
| | |
|---|---|
| *H04W 72/12* | (2023.01) |
| *G06F 9/48* | (2006.01) |
| *H04L 49/90* | (2022.01) |

(52) U.S. Cl.
CPC .......... *H04W 72/12* (2013.01); *G06F 9/4881* (2013.01); *H04L 49/90* (2013.01)

(58) Field of Classification Search
CPC ............. H04W 72/0446; H04W 72/12; H04W 72/1263; H04W 28/14; H04L 49/90;
(Continued)

(56) References Cited

U.S. PATENT DOCUMENTS

| | | |
|---|---|---|
| 11,336,383 B2 | 5/2022 | Mula et al. |
| 2011/0050713 A1* | 3/2011 | McCrary ............... G06F 9/3851 345/530 |

(Continued)

OTHER PUBLICATIONS

Lena Olden et al. Infiniband-Verbs on GPU: A case study of controlling an Infiniband network device from the GPU,University of Heidelberg, Institute of Computer Engineering, Heidelberg, Germany; Publication date: Dec. 4, 2014 IEEE International Parallel & Distributed Processing Symposium Workshops.

(Continued)

*Primary Examiner* — Sudesh M. Patidar
(74) *Attorney, Agent, or Firm* — PEARL COHEN ZEDEK LATZER BARATZ LLP (57) ABSTRACT

A computer based system and method for sending data packets over a data network may include: preparing data packets and packet descriptors on one or more graphical processing units (GPUs); associating packets with a packet descriptor, which may determine a desired transmission time of the packets associated with that descriptor; receiving an indication of a clock time; and physically transmitting packets via an output interface, at a clock time corresponding to the desired transmission time. A computer based system and method for GPU-initiated communication over a 5G data network may include allocating one or more memory buffers in GPU memory; performing at least one 5G signal processing procedure by a GPU; preparing descriptors for a plurality of packets, where each packet includes allocated memory buffers, and where the descriptors provide scheduling instructions for the packets; and triggering the sending of packets over the network based on prepared descriptors.

18 Claims, 6 Drawing Sheets

(58) Field of Classification Search
CPC ..... H04L 47/50; H04L 1/1887; G06F 9/5016; G06F 9/4881; G06F 3/0656; G06F 13/1673; G06F 2212/1024; G06F 3/0613; G06F 2209/509; G06F 13/161

See application file for complete search history.

(56) References Cited

U.S. PATENT DOCUMENTS

| | | | |
|---|---|---|---|
| 2013/0297919 A1* | 11/2013 | Kang | G06F 9/38 712/241 |
| 2014/0226521 A1 | 8/2014 | Jiliani et al. | |
| 2015/0039793 A1 | 2/2015 | Rossetti | |
| 2016/0117277 A1 | 4/2016 | Raindel et al. | |
| 2018/0004693 A1 | 1/2018 | Macnamara et al. | |
| 2018/0107627 A1 | 4/2018 | LeBeane et al. | |
| 2018/0114290 A1 | 4/2018 | Paltashev et al. | |
| 2019/0102223 A1 | 4/2019 | Power et al. | |
| 2019/0158429 A1* | 5/2019 | Friedman | H04L 41/06 |
| 2019/0221223 A1 | 7/2019 | Dutta et al. | |
| 2019/0340725 A1 | 11/2019 | Amento et al. | |
| 2020/0151127 A1 | 5/2020 | Amento et al. | |
| 2020/0301609 A1* | 9/2020 | Haga | G06F 3/0638 |
| 2021/0117360 A1* | 4/2021 | Kutch | G06F 3/0656 |
| 2021/0149821 A1* | 5/2021 | Cui | G06F 12/1036 |
| 2021/0390004 A1 | 12/2021 | Kundu et al. | |
| 2021/0409137 A1* | 12/2021 | Mula | H04L 43/0852 |
| 2022/0150898 A1* | 5/2022 | Jin | G06F 9/455 |
| 2022/0151022 A1 | 5/2022 | Chikkur et al. | |
| 2022/0272052 A1* | 8/2022 | Jung | G06F 9/3851 |
| 2022/0385598 A1 | 12/2022 | Pismenny et al. | |
| 2023/0276301 A1 | 8/2023 | Potluri et al. | |
| 2023/0276422 A1 | 8/2023 | Agostini | |
| 2024/0078185 A1 | 3/2024 | Agostini | |

OTHER PUBLICATIONS

Michael Lebeane et al. 'GPU Triggered Networking for Inta-Kernel Communications'; SC17, Nov. 12-17, 2017, Denver, CO USA.

Fera Daoud et al. GPUrdma: GPU-side library for high performance networking from GPU kernels; Ross 16; Jun. 1, 2016; © 2016 ACM ISBN 978-1-4503-4387-0/16/06; Proceedings of the 6th International Workshop on Runtime and Operating Systems for Supercomputers.

S. Potluri et al. GPU-centirc Communication on NVIDIA GPU Clusters with InfiniBand: A case study with OpenSHMEM; 2017 IEEE 24th International Conference on High Performance Computing (HiPC).

Hamidouche, K., & LeBeane, M. (Feb. 2020). Gpu initiated openshmem: correct and efficient intra-kernel networking for dgpus. In Proceedings of the 25th ACM SIGPLAN Symposium on Principles and Practice of Parallel Programming.

Orr, M. S., Che, S., Beckmann, B. M., Oskin, M., Reinhardt, S. K., & Wood, D. A. (Nov. 2017). Gravel: Fine-grain gpu-initiated network messages. In Proceedings of the International Conference for High Performance Computing, Networking, Storage and Analysis.

Lebeane, M., Hamidouche, K., Benton, B., Breternitz, M., Reinhardt, S. K., & John, L. K. (Nov. 2018). ComP-net: Command processor networking for efficient intra-kernel communications on GPUs. In Proceedings of the 27th International Conference on Parallel Architectures and Compilation Techniques.

Office Action for U.S. Appl. No. 17/854,522 dated Jul. 29, 2024.

Multi-Layer Packet Classification with Graphics Processing Units; Varello et al, published Dec. 2014.

PacketShader. A GPU-Accelerated Software Rourer; Han et al, published Sep. 10, 2010.

Office Action for U.S. Appl. No. 17/854,522 dated Nov. 7, 2024.

Office Action for U.S. Appl. No. 17/854,522 mailed Feb. 18, 2025.

Office Action for U.S. Appl. No. 17/854,522 mailed Jul. 15, 2025.

* cited by examiner

SYSTEM AND METHOD FOR GPU-INITIATED COMMUNICATION

PRIOR APPLICATION DATA

The present application claims benefit from prior U.S. provisional application 63/314,420 filed on Feb. 27, 2022, incorporated by reference herein in its entirety.

FIELD OF THE INVENTION

The present invention relates generally to using a graphical processing unit (GPU) for data transmission, and for the receiving and processing of data, for example in the context of communication over a cellular network.

BACKGROUND OF THE INVENTION

Present technologies for data transmission (e.g. communication over cellular networks, or communication over other networks) make use of packet transmission, where a computing device, including a processing unit (such as a central processing unit, or CPU, which is a general-purpose processor), is responsible for assembling or preparing packets from memory buffers and for sending of prepared packets from the computing device to a network adapter, such as a network interface card. The network adapter may then transmit the packets into the network, such that they may be received by another, different network adapter of a target device, which may be, for instance, a smartphone.

High bandwidth wireless communication in 5G networks involves transmitting, as well as receiving and/or processing, of large amounts of packets via a radio network to, e.g., a plurality of cellular telephones; the packets transmitted to a given phone would be transmitted at a very specific time, e.g., in very accurate timeslots, after which additional packets may be transmitted to another, different phone. Such transmission may also be conditional: if, for instance, a first packet for a given phone is for example transmitted or received at a very specific time, then many other packets for that phone or for another, different phone, may be configured to follow shortly or immediately thereafter. Thus, wireless communication in 5G networks may prove very computationally intensive-forcing substantial workloads on the different units involved in preparing packets, in sending the packets to a network adapter, and in scheduling their time of transmission.

One of the well-known bottlenecks in packet transmission processes is the very limited processing capabilities of the network interface card. For this reason, some transmission methodologies impose the responsibility of scheduling transmission times on CPU instead of on the network adapter. This strategy entails preparing packet descriptors that include transmission scheduling instructions, such as "transmit at time X", to simply be read and executed by the network adapter. The Mellanox Send Operation is an example of one present technique employing such a strategy; as such, it makes use of a dedicated buffer in CPU memory otherwise known as the Send Queue (SQ), where packet descriptors, which may be work queue entries (WQEs), are stored. Descriptors may include packet-related information such as memory address, size, type of send operation to be performed, and the like. Once populated with appropriate packet descriptors, the CPU may update the network adapter's registers to read the SQ from CPU memory and thereby trigger packet transmission based on packet descriptors' contents. In such a manner, packets sent by the CPU to the network adapter may be transmitted at a desired time without requiring any scheduling tasks from the latter.

These techniques, however, do not mitigate the processing bottleneck associated with the various tasks imposed on the CPU. Packet transmission rate and corresponding communication efficacy may be compromised in common cases where the processing unit is mostly occupied with received signal processing and/or with producing data that should later be packaged and transmitted in packets. Requiring the processing unit to prepare packet descriptors to be read by the network adapter might also degrade the overall system performance by involving additional workloads.

SUMMARY OF THE INVENTION

A computer based system and method for sending data packets over a network such as a cellular network may include, in accordance with an exemplary embodiment of the present invention: preparing data packets and packet descriptors on one or more graphical processing units (GPUs); storing the data packets and descriptors in GPU memory; associating one or more packets with a packet descriptor, which may determine a desired transmission time of the packets associated with that descriptor; receiving an indication of a clock time; and, for each packet associated with said packet descriptor, physically transmitting the packet via an output interface, at a clock time corresponding to the desired transmission time. A computer based system and method for GPU-initiated communication over a 5G data network may include, in accordance with an exemplary embodiment of the present invention: allocating, by a central processing unit (CPU), one or more memory buffers in GPU memory; performing at least one 5G signal processing procedure by a GPU; preparing, by a GPU, descriptors for a plurality of packets, where each packet includes allocated memory buffers, and where the descriptors provide scheduling instructions for the packets; and triggering, by a GPU, the sending of packets over the network based on prepared descriptors.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

When discussed herein, a computer processor or graphical processing unit performing functions may mean one computer processor or graphical processing unit performing the functions or multiple computer processors, graphical processing units, or modules performing the functions; for example, a process as described herein may be performed by one or more processors, or graphical processing units, possibly in different locations.

Recent developments in graphical processing unit (GPU) technology have enabled shifting signal processing and data production responsibilities, e.g., based on repetitive mathematical calculations, from a central processing unit (CPU) using more computationally economical GPU-based calculations. A GPU may be a specialized processor able to process a large number of math operations in parallel, but which typically does not have the general purpose flexibilities of a CPU. At present, it is estimated that, for instance, 10 trillion watt-hours of energy a year may be saved by replacing all CPU-only servers executing artificial intelligence (AI) applications worldwide by GPU-accelerated systems. Nevertheless, in present technologies, the vast amount of data processed or produced by GPUs are communicated using CPU-based packet transmission methodologies. Thus, despite being free from data processing and production responsibilities, in some systems the CPU becomes the main communication rate-limiting factor as it communicates with GPUs to perform calculations and process/produce data (via, e.g., dedicated general-purpose processing platforms such as the compute unified device architecture (CUDA) platform, making use of dedicated libraries and network protocols such as InfiniBand Verbs); prepare or create packets from produced data to be transmitted over the network; provide scheduling instructions to the network adapter by means of preparing packet descriptors; and trigger packet transmission by a network adapter by updating its registers as described herein.

Embodiments of the invention may shift packet and scheduling instruction preparation and/or processing, as well as the triggering of packet transmission (e.g., by a network adapter) responsibilities from the CPU onto less occupied and potentially computationally more viable GPUs. This may allow much higher packet transmission rate that may, for example, better utilize 5G-network-based communication technologies and be used is corresponding communication algorithms involved in the transmission of packets over a 5G data network. Those skilled in the art would recognize that while transmission of packets over a 5G network is used as an example context, the GPU initiation and triggering of communication aspect can be used in other, different contexts as well. For example, parallel programming interfaces and GPU-accelerated libraries such as the NVIDIA collective communication library (NCCL) and NVSHMEM™ used by many high-performance computing systems or clusters may also employ GPU-initiated communication as disclosed herein.

Embodiments of the present invention may allow performing data packet preparation, scheduling, sending or transmission, and processing protocols that involve desirable GPU acceleration. Such protocols may allow shifting vast amounts of workloads from a CPU, often being the transmission rate limiting factor, to computationally more viable GPUs. In some embodiments, a CPU may mainly be used for instructing one or more GPUs to perform various tasks (e.g., to process or produce data) instead of performing said tasks on its own. Instructions by a CPU may be carried out using, e.g., general-purpose processing platforms such as the CUDA parallel computing platform. Such platforms may employ GPU accelerated signal processing (such as, for example, offered by the NVIDIA Aerial application framework including the cuBB software development kit for GPU accelerated 5G signal processing, and cuPHY for Layer 1 5G PHY).

Figure 1:
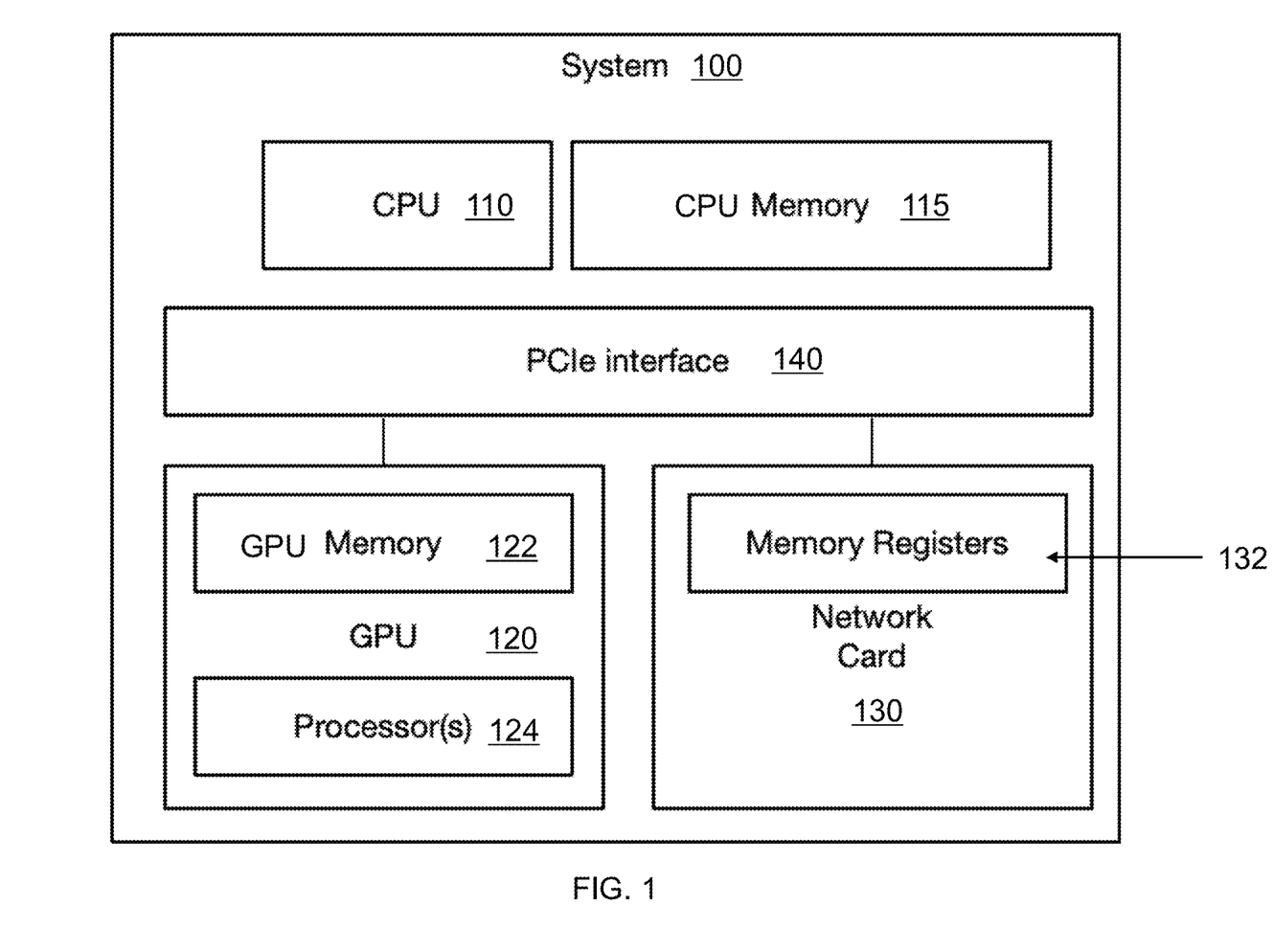
FIG. 1 is a high-level block diagram of an exemplary computing device according to some embodiments of the present invention.

Reference is made to FIG. 1, showing a nonlimiting, block diagram of an exemplary computing system 100 according to some embodiments of the present invention. System 100 may include a CPU 110, which may be implemented on a chip and manifested in any appropriate CPU 110 architecture as known in the art. System 100 may include a CPU memory 115, which may be, or may include machine-readable media for storing software e.g., a Random-Access Memory (RAM), a read only memory (ROM), a memory chip, a Flash memory, a volatile and/or non-volatile memory or other suitable memory units or storage units. CPU memory 115 is typically physically separate from CPU 110 (but in some cases may be on the same chip as the CPU), and may be or may include a plurality of, possibly different memory units. CPU memory 115 may be a computer or processor non-transitory readable medium, or a computer non-transitory storage medium, e.g., a RAM. System 100 may include a GPU 120 in various physical architectures (non-limiting examples include: Gen7, G80, Tesla, Fermi, Kepler, GCN 1-4, R700, etc.). GPU 120 may include its own GPU memory 122 (being physically separate than CPU memory 115) which may be, or may include high-bandwidth RAM and synchronous dynamic random-access memory units appropriate for GPUs, such as GDDR SDRAM, GDDRn or GDDRnX (x=1-6), and the like, as known in the art. GPU 120 may include a plurality of processors or processing units 124 according to a specific architecture as known in the art. Processors 124 may be configured (e.g., by executing software or code as part of a CUDA program) to carry out methods and operations described herein, for example by using dedicated circuitry. System 100 may include a network card or adapter 130, which may be, for instance, a wired or wireless network interface controller (NIC). Network card 130 may include memory registers 132, which may be updated by GPU 120 in order to trigger packet sending or transmission as further described herein. Finally, system 100 may include a peripheral component interconnect (PCI) or PCI express (PCIe) interface 140 to connect GPU 120 to network card or adapter 130.

Packet preparation, scheduling, sending/transmission, and processing as described herein may be very helpful in various communication contexts. For example, IEEE precision-time-protocol requires accurate timestamping of egressing packets. In another example, high-resolution video feeds require very accurate packet transmission times for egressing packets; sending or transmitting the first packet in each video frame at a very accurate time is believed to be sufficient. A video frame may generally comprise a large number of packets, such as 1,000 or 10,000 packets. Sending video frames as described in this paragraph may also be helpful in implementing systems compliant with the SMPTE 2110-21 standard.

As in conventional packet processing/scheduling systems, packets which originate in a host processor, and which are stored in an off-chip host memory for the processor, may be transmitted to a destination by a network adapter 130, which may be, e.g., a network interface controller. Once transmitted to a destination, packets may be sent to their corresponding host processor via its own network adapter 130. In general, packet processing may take place in accordance with any of a number of well-known packet processing specifications such as, by way of non-limiting example, the InfiniBand standard, the Ethernet standard; and the PCIx or PCIe systems.

In some embodiments, packets may be created or prepared, e.g. by GPU 120, using data from or reference to one or more memory buffers in GPU memory 122, for example the packets may include the memory buffers. Either singular or multiple memory segments and/or data buffers may be merged to form single- or multi-segment data packets, respectively. Thus, a plurality of processed or newly produced data from which packets may be assembled, and/or the corresponding packets themselves, may be generated and/or prepared by GPU 120 and stored in GPU memory 122. In other embodiments, at least some data and/or data packets may be received by GPU 120 from an external source via an input interface, the external source being, e.g., physically separate from GPU 120. Such external source may be, e.g., CPU 110 in a computing system such as system 100. Input interfaces may include, but are not limited to, host-to-device transfers in a CUDA platform-based program. By way of non-limiting example, some embodiments may allow data packets to be prepared from one or more memory buffers in CPU memory 115 as known in the art. In other embodiments, some packets may be stored in CPU memory 115 while other packets are prepared and stored in GPU memory 122. In some embodiments, GPU 120 may be configured to prepare packets in parallel to perform a plurality of signal processing and data production processes (it may, for instance, be involved in various 5G signal processing operations, including, but not limited to: processing of physical downlink shared channels (PDSCHs), processing of physical downlink control channels (PDCCHs), processing of physical broadcast channel (PBCHs), and the like—via, for instance, a CUDA kernel making use of appropriate libraries such as Aerial 5G, and storing the output in a contiguous buffer of GPU memory. Similarly, it may also be simultaneously involved in data production and 5G packet preparation procedures). Some embodiments of the invention may require registering or "patching" different system components to appropriate data plane libraries (such as the Data Plane Development Kit) or employ appropriate hardware drivers in order to ensure overall compatibility between, e.g., one or more CPUs, GPUs, and network adapter 130s in a given computer system. Embodiments may employ dedicated libraries and network protocols such as InfiniBand Verbs via general-purpose processing platforms such as the CUDA platform, and the like.

Similarly, packet descriptors or other packet defining structures may be created or prepared by GPU 120 and stored in GPU memory 122, while in other embodiments at least some packet descriptors may be received by GPU 120 from an external source via an input interface. Descriptors may include, but are not limited to, work queue entries (WQEs) as known in the art. In some embodiments of the invention, descriptors may include packet-related information such as memory address, size, type of send operation to be performed, and the like, as well as transmission scheduling instructions (e.g. send at a specific time, do not send until packets include specific data, etc.) as further explained herein.

Prepared packet descriptors may be stored in a dedicated buffer in GPU memory 122, otherwise known as GPU 120 Send Queue (SQ). This buffer may, e.g., be used in a manner analogous to its CPU 110 equivalent in the Mellanox Send Operation. In some embodiments of the invention, GPU memory buffers may be general memory buffers that are allocated by a processing unit (e.g., CPU 110), such that they are made available for use by GPU 120, e.g. for in packet preparation procedures and operations. Once allocated, the SQ as well as additional GPU memory buffers may be populated at a given timeslot by the relevant processing unit to include the packet descriptors under consideration (e.g., such that the SQ is prepared for the next timeslot by including all packets and descriptors that are to be sent then). In a similar manner, a processing unit may remove unused packets and descriptors from GPU memory buffers according to various performance requirements as known in the art. In some embodiments, a processing unit (e.g., GPU 120) may populate the SQ or other memory buffer by pointing one or more payload addresses associated with relevant packets and descriptors to one or more offsets of that memory buffers.

Once descriptors are stored in SQ, GPU 120 may associate one or more packets with a packet descriptor in advance of triggering or initiating packet sending or transmission by network adapter 130 at a desired time. In some embodiments, this may be done by pointing the given descriptor's payload address to the right offset of the data buffer as known in the art. Different association methods and operations may be used as well. Network adapter 130 may in response to the trigger send or transmit the packets based on the associated packet descriptors and the information contained in them. In some embodiments, network adapter 130 may be configured to read packet descriptors that have been received from a processing unit (e.g., sent to the adapter by GPU 120), and schedule or determine packet transmission time based on their contents. In other embodiments, a processing unit (which may be, e.g., CPU 110) may be configured to read packet descriptors and send relevant packets and/or descriptors to network adapter 130 based on their contents.

Figure 2:
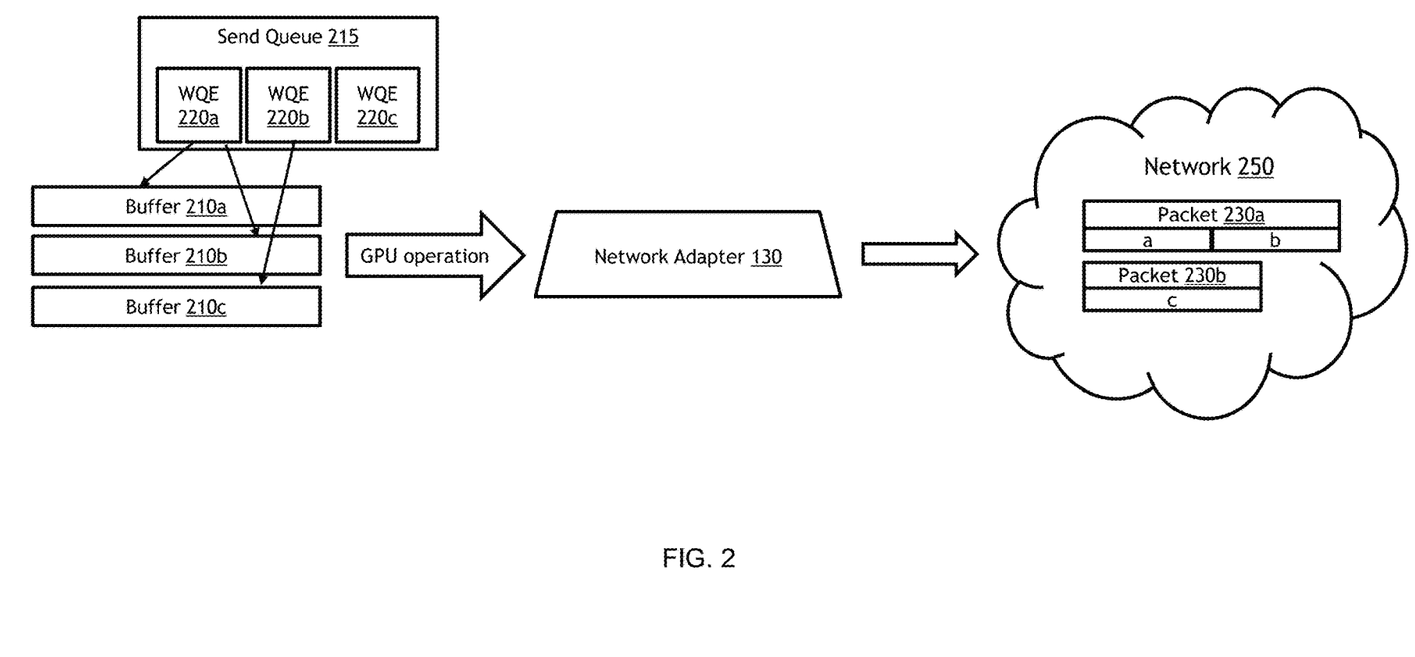
FIG. 2 is a block diagram depicting components and data involved in an example send-queue-based packet transmission process according to some embodiments of the present invention.

Reference is now made to FIG. 2, which depicts a block diagram of different components involved in an example SQ-based packet transmission process according to some embodiments of the present invention. Memory buffers 210a-c may be merged into packets (and thus packets may include memory buffers) and be associated, by GPU 120, with WQEs 220a-c which form the SQ 215 or other buffer or memory buffer. In the present example, WQE 220a is associated with buffers 210a and 210b to form packet 230a; WQE 220b is associated with buffer 210c to form packet 230b; and WQE 220c is not associated with any memory buffer. Based on appropriate operations by GPU 120, packets 230a-b may be sent to, and WQEs 220a-c, may be read by network adapter 130, which may be, e.g., a network interface controller. Network adapter 130 may, in turn, send or transmit said packets over a data network 250 (which may be, e.g., a 5G network as described herein) based on the descriptors.

Figure 3:
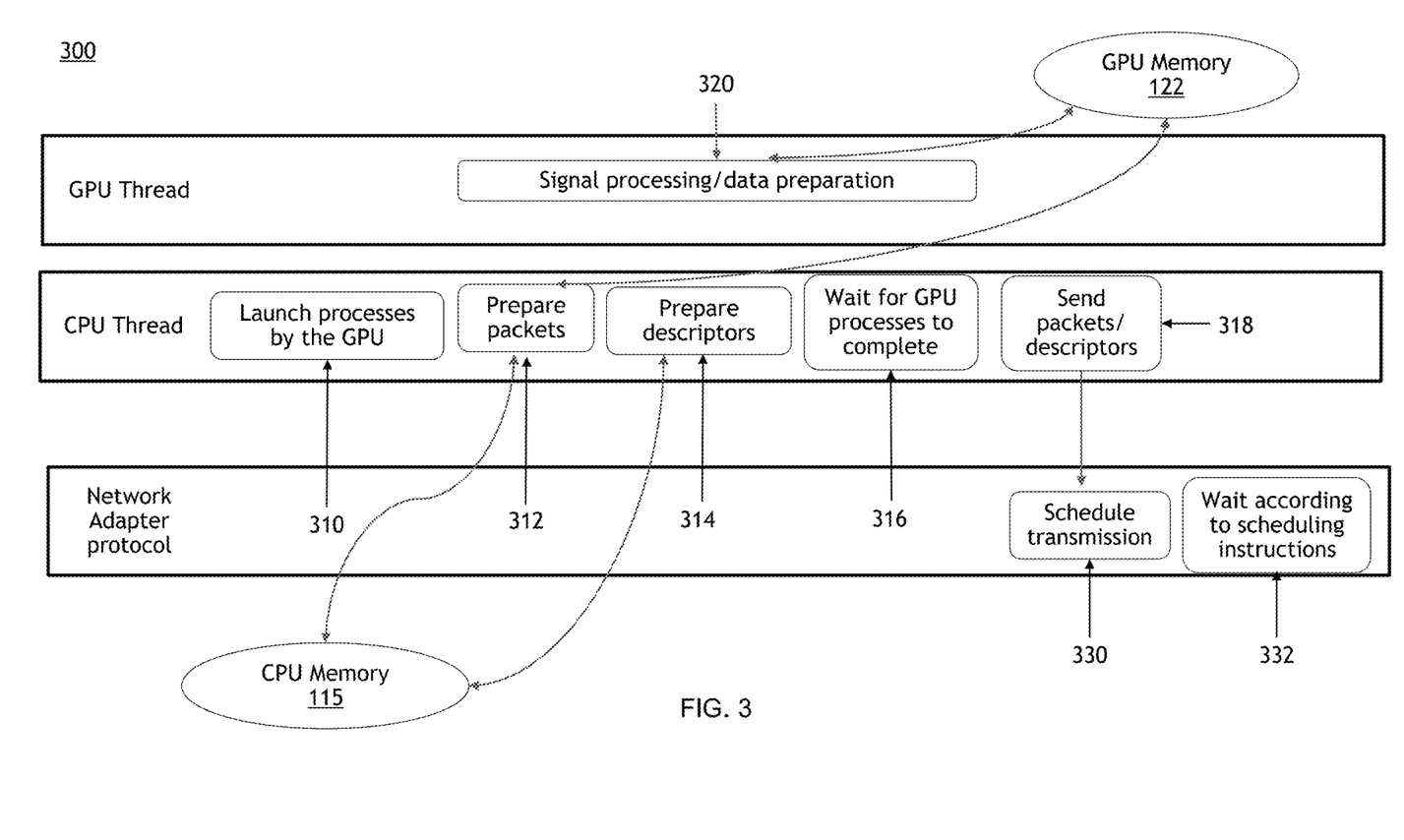
FIG. 3 is a block diagram illustrating an example packet-transmission-based communication process as carried out in some embodiments of the invention.

An example packet-transmission-based communication process 300 as carried out in some embodiments of the invention is illustrated in FIG. 3. In this example, CPU 110 may launch signal processing/data preparation processes on GPU 120 (operation 310). GPU 120 may carry out the corresponding processes (operation 320). CPU 110 may then prepare data packets based on output data from GPU memory 122, and the prepared packets may then be stored in CPU memory 115 (operation 312). CPU 110 may then prepare packet descriptors, "chaining" or "linking" one or more packets together with respect to their scheduled sending and transmission times (operation 314). CPU 110 may be required to stand idle and wait for GPU 120 to complete processing or preparing the data under consideration (operation 316); only then the sending of packets and descriptors from CPU 110 to network adapter 130 may begin (operation 318). Network adapter 130 may then schedule the transmission of the packets received from CPU 110 (operation 330); in some cases, network adapter 130 may receive scheduling instruction(s)—included, for instance, in packet descriptors received from CPU 110—that may require it to wait (operation 332) until predefined conditions are met (for instance, transmit at particular clock time X).

Figure 4:
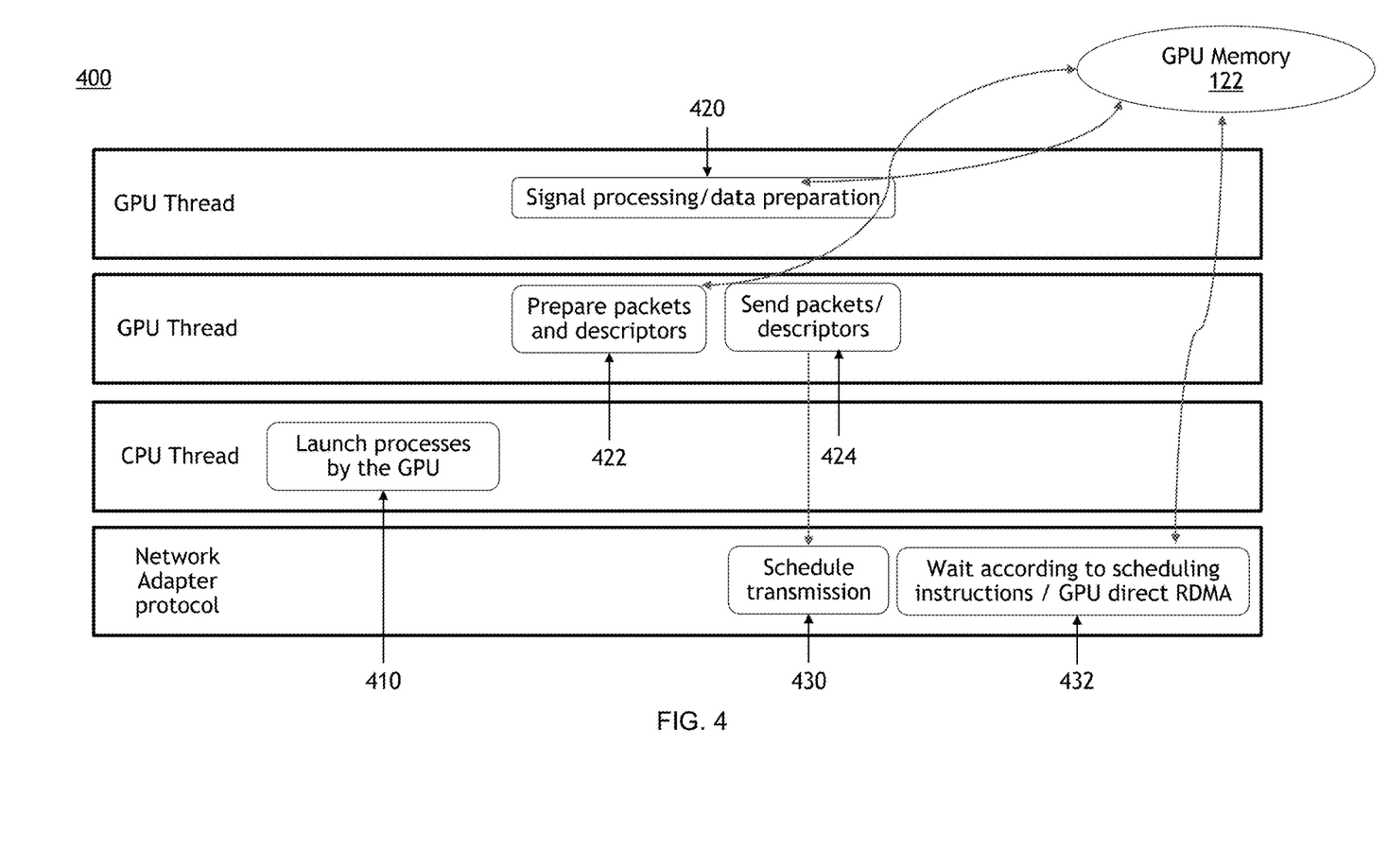
FIG. 4 is a block diagram of an example packet-transmission-based communication process according to some embodiments of the present invention.

Reference is now made to FIG. 4, which is a block diagram of an example packet transmission process 400 according to some embodiments of the present invention. As in process 300, CPU 110 may initiate process 400 by causing GPU 120 to launch signal processing/data preparation on (operation 410). GPU 120 may then carry out the corresponding processes (operation 420), and simultaneously or concurrently prepare packets and descriptors which may then be stored in GPU memory 122 (operation 422). GPU 120 may then immediately send prepared packets and descriptors to network adapter 130 (operation 424); network adapter 130 may then schedule the transmission of the packets received from GPU 120 (operation 430), taking scheduling instruction(s) included in packet descriptors into account. Given such instructions, network adapter 130 will wait until conditions included in the instruction are fulfilled, and then physically send or transmit the packets under consideration based on the descriptors (operation 432).

In some embodiments, GPU 120 may be configured to perform various additional operations involving packet descriptors, which may include, e.g., modifying the contents of one or more packet descriptors, updating addresses of packets in a packet descriptor, and truncation of data in a packet pointed to by a packet descriptor, as known in the art. In some embodiments, GPU 120 may be configured to generate or prepare metadata pointing to different packets or descriptors and describing their state at a given timeslot or timeframe. Such metadata may include, for instance, the number of packets sent/received at a given time interval, a set of initial timeslot timestamps, and enhanced common public radio interface (eCPRI) header information—and may be used in order to monitor packet sending and transmission protocols as known in the art.

In some embodiments, GPU 120 may be configured to move unused packet descriptors (e.g., descriptors that are no longer associated with any given packet) to a Completion Queue (CQ), such that more memory is made available in SQ 215—which may, in turn, include more packet descriptors associated with future transmission procedures and operations. GPU 120 may also be configured to move descriptors from the CQ back into SQ 215—for instance, in case a given descriptor may be reused for newly produced packets (such that, e.g., CPU 120 may avoid preparing the descriptor once more). In a similar manner. GPU 120 may be configured to clear packet descriptors from the CQ, e.g., based on a predefined expiry date for a corresponding set of packets. In some embodiments, SQ 215 and CQ may be managed as ring buffers.

Different queuing modules, which may support multiple queues, may also be used in other embodiments of the invention. Embodiments that employ a plurality of queues may allow performing packet transmission based on a predetermined priority for a given queue. GPU 120 may be configured operative to determine a priority for a given queue based on, e.g., present applications and/or processes currently executing on GPU 120. In some embodiments, queue priorities may be implemented in packet descriptors prepared or modified by GPU 120. In some other embodiments, priorities may be included in packet descriptors regardless of the queue they are placed in. Various combinations of descriptor-based and queue-based priorities may be used in other embodiments.

High bandwidth wireless communication in 5G networks involves the transmission of a number of packets over a radio network to, e.g., a number of cellular telephones at very specific and exact times. In addition, IEEE precision-time-protocol requires accurate timestamping of egressing packets. It is thus desirable to provide a system in which the time at which a packet is transmitted is known. It may also be desirable to determine, in advance, the time of transmission for one or more packets according to, e.g., performance considerations. In some embodiments of the present invention, this may be achieved by including, in a packet descriptor, a transmission scheduling instruction of a "wait-on-time" type (e.g., "transmit packets at time X")—by which packet transmission at a desired time may be triggered or executed. Such instruction may determine a desired transmission time for any packet associated with that descriptor. Analogous procedures for CPU-based systems are known in the art. While network 250 as described herein may be a cellular network, other networks may be used, e.g. wired networks.

In a similar fashion, "wait-on-data" scheduling instruction may also be used in some embodiments of the invention, thus serving as an additional tool for regulating and initiating or triggering packet transmission processes according to e.g., performance considerations. Instructions of this sort may determine a transmission time according to the availability of predefined data or amount of data in GPU memory 122 and/or CPU memory 115 (e.g., "do not transmit until the one or more packets associated with a given packet descriptor include predefined data and/or amount of data"). In some embodiments, predefined data may correspond to one or more processed 5G signals. When such data becomes available (e.g., it has finished being produced/processed by GPU 120; has been fully received from an external source and stored in GPU memory 122; has been made available in CPU memory 115; or has been included or made available in a particular packet—in accordance with data production and/or signal processing procedures and paradigms used in some of the embodiments as disclosed herein) GPU 120 or CPU 110 may then respond by "raising" a "data ready" flag as known in the art (for instance, as employed for the CX7 network card and its equivalents).

Both wait-on-time and wait-on-data descriptors may be read by a network adapter 130 for the purpose of executing packet transmission as further explained herein.

Once packets have been created or prepared by GPU 120 (which may, in some embodiments of the invention, involve waiting for the completion of a signal processing or data production process), GPU 120 may send the prepared packets to network adapter 130, which may be responsible for physically transmitting the packets over network 250. In some embodiments, the sending of the packets to network adapter 130 may include writing to, setting or updating the adapter's database registers 132 as known in the art, which may trigger sending or transmission of data. In some embodiments, updating or setting certain of the adapter's registers 132 by GPU 120 may initiate or trigger packet transmission by network adapter 130. In some embodiments of the present invention, GPU 120 may also be configured to hold one or more packets until the time of transmission, the one or more packets being held including at least one packet associated a packet descriptor which determines its desired transmission time.

Network adapter 130 may include e.g., a physical layer or output interface composed of, for instance, of a separate memory unit configured to store incoming packets, an arbitration module which fetches packets from said memory unit, a media access control module that verifies that a given packet is in an allowed format, a real-time hardware clock which is kept synchronized to Universal Time Coordinated (UTC) using mechanisms known in the art of time synchronization such as, by way of non-limiting example, precision time protocol (PTP), as well as additional components as known in the art.

In some embodiments of the invention, GPU 120 may send a packet in addition to an accompanying packet descriptor from GPU memory 122 via bus to network adapter 130—in which the packet and the accompanying descriptor may be stored in an on-chip memory. In some embodiments, a descriptor may be first sent to network adapter 130 and stored in the on-chip memory before a packet associated with the descriptor is fetched by or sent to network adapter 130; such descriptor may be sent from SQ 215 based on, e.g., the availability of its corresponding packet in GPU memory 122.

Network adapter 130 may be configured to read one or more packet descriptors from SQ 215 in GPU memory 122 once the adapter's registers 132 have been updated as described herein. Network adapter 130 may then transmit or schedule the transmission of the packets based on appropriate scheduling instructions provided in their corresponding descriptors.

In some embodiments, network adapter 130 may be configured to select particular packets which are to be transmitted at an exact time (e.g., based on a wait-on-time descriptor as described herein) and modify one or more descriptors associated with said packets, as known in the art.

In some embodiments, predefined priorities as described herein may determine the transmission of a given packet by network adapter 130; for instance, it may be configured to transmit one or more highly prioritized packets as quickly as possible, to avoid transmitting low-priority packets until high-priority packets are no longer waiting to be transmitted, or not to transmit low-priority packets altogether. It is appreciated that, in accordance with the description provided herein, certain packets (such as those with lower priority) might, in some cases, never be transmitted—since higher priority packets and/or packets to be transmitted based on coarse time scheduling might use all available transmission capacity. In such a case, certain packets may be discarded, as is known in the art.

In order to transmit a packet in a very accurate time slot, some embodiments of the invention may use a clock (such as, by way of non-limiting example, a UTC clock or an international atomic time clock) included in network adapter 130 as known in the art, which may provide network adapter 130 with indications of clock times as known in the art.

Appropriate wait-on-time scheduling instructions or requests may be included in one or more corresponding packet descriptors as described herein for the purpose of transmitting one or more packets at specific, exact times. In some embodiments, the requests and desired times of transmission may be read by network adapter 130, which may then transmit said packets at the exact times requested according to a corresponding clock time. In some embodiments, a wait-on-time request may result in "stalling" the relevant packets in a memory unit of network adapter 130 until that time is reached. In other embodiments, a wait-on-time request may result in additional "stalling" of the packets in GPU memory 122 before they are sent to network adapter 130.

Similarly, wait-on-data may be included in one or more corresponding packet descriptors as described herein, for the purpose of transmitting one or more packets once specific, predefined data or amount of data are made available (e.g., data which may be used to indicate that a given process has reached a particular stage). As for wait-on-time requests, some embodiments of the invention may include reading wait-on-data requests by network adapter 130, which may then send or transmit said packets over network 250 based on scheduling instructions and/or according to appropriate transmission settings (e.g., as soon as possible (ASAP), according to predefined priorities as disclosed herein, according to requirements included in additional packet descriptors, and so forth). In some embodiments, at least some of the data requested to be made available is found in network adapter memory. Some embodiments may include wait-on-data requests that point to memory buffers 210 in at least one of: GPU memory 122, CPU memory 115, and network adapter memory.

In some embodiments of the invention, one of GPU memory 122, CPU memory 115, or network adapter memory may include a "doorbell record" buffer that contains indices of the last used/submitted/read packet descriptors. Such buffer may allow, e.g., the real-time monitoring of the SQ 215 for removing unused descriptors. Some embodiments of the invention may include issuing memory barriers (e.g., a barrier instruction that causes a processing unit to enforce ordering constraints on memory operations, such as perform operations a, b, c before bather instruction, and operations e, f, g after barrier instruction) between different steps of one or more procedures involving packet preparation; and/or packet descriptor preparation; and/or packet transmission, as well as ones involving the receiving and/or processing of packets as further described herein. In order to successfully process network requests, it may be desirable, for instance, to guarantee the availability and accessibility of data packets and/or packet descriptors to network adapter 130, or to ensure the visibility of a given doorbell record, before the triggering of packet transmission by network adapter 130. It may also be required for example to ensure memory coherency for GPU memory 122 prior to updating the doorbell record, as sending protocols and/or procedures and the corresponding system (e.g., computing system 100) may fail during execution attempts. Achieving such a feature by issuing memory barriers may thus be desirable in some embodiments, since failure in prior or subsequent updating of network adapter 130 registers may cause network adapter 130 to read doorbell records up to the most recent value in the doorbell record buffer. In other words, updating the doorbell record value may be viewed as already submitting the data packets and corresponding descriptors to the network adapter even if the actual submission may also require updating of network adapter 130 registers. In some embodiments of the invention, several memory barriers of different lengths may be used to enable optimized packet transmission and/or processing procedures: longer memory barrier may be used, for example, in order to ensure the readability of GPU memory 122 segments (e.g., a packet descriptor or doorbell record) by external device (e.g., network adapter 130 or CPU 110), and shorter such barriers may be used guarantee for example the availability of data/packets/descriptors in GPU memory 122 before the production of additional, different data/packets/descriptors. In some other embodiments, memory barriers of different lengths may be employed in various procedures executed on either GPU 120, CPU 110, or network adapter 130, and involving memory units of different devices.

Previous solutions and technology for communication over a data network including GPU units focus on receiving e.g. data packets by a CPU unit, and subsequently signaling to a corresponding GPU unit that incoming data packets have been received; only then the latter GPU unit may be used to process the incoming data packets. Such solutions thus involve an additional workload on the CPU unit responsible for signaling and/or communicating with the GPU unit in order to enable further processing of the incoming packets. Since the receiving of packets may for example be a precondition for the sending of packets by the receiving unit, e.g., as part of a communication protocol involving a data network-removing unnecessary workloads and reducing associated execution times may be desirable in the context of establishing high-speed communication protocols. Embodiments of the invention may allow for example receiving a plurality of packets by GPU 120 instead of by CPU 110—such that CPU 110 would not be required to signal and/or notify GPU 120 that new incoming data packets have been received and are waiting for further processing by GPU 120. This may enable for example to spare workloads associated with such signaling and/or notification actions by CPU 110 in a system such as e.g. system 100, which may further mitigate the CPU-associated bottleneck discussed herein. In some embodiments of the invention, data preparation and/or processing protocols or procedures by GPU 120 may not be trivially synchronized with descriptor preparation (which may for example result in storing relevant descriptors in SQ and/or CQ memory buffers as described herein). Such effect may relate, for example, to handling different tasks by network adapter 130 in a simultaneous manner—e.g., both writing received data to GPU memory 122 and updating or performing write operations on packet descriptors found in the SQ and/or CQ. In some cases, GPU 120 may read a descriptor memory buffer such as SQ or CQ, or descriptors included in these buffers, and thus be "aware" of updating of descriptors by network adapter 130 even before appropriate data is received (e.g., while it is still being written into GPU memory 122 by network adapter 130)-which may result in errors and/or failure. In some embodiments of the invention, such errors and/or failure may be prevented by establishing an appropriate signaling procedure involving GPU memory 122 and network adapter 130. An example such procedure may be, for example:

a. GPU 120 may be configured to poll (e.g. read continuously or periodically) the SQ or CQ for detecting an updating of one or more descriptors.

b. Once such updating is detected, GPU 120 may notify or signal network adapter 130 (by for example performing a dump operation or a remote direct memory access (RDMA) read on network adapter 130 memory).

c. Upon receiving the notification or signal, network adapter 130 may respond with performing read operations on GPU memory 122, which may entail "pushing", completing, or suspending a plurality of write operations (which may be for example all write operations) currently performed on GPU memory 122 by network adapter 130.

d. Network adapter 130 may then update or write to a GPU memory buffer in order to indicate that previous operations (such as for example those described in b-c herein) are complete.

e. GPU 120 may poll or read an update or write operation by network adapter 130 (such as for example that performed on d. herein) to ensure that the relevant data associated with the updating of descriptors under consideration may indeed be found in a desirable state (which may be for example fully processed and/or generated and/or available in GPU memory 122, ready to be consumed or deleted by GPU 120, and so forth).

Those skilled in the art may recognize, however, that a plurality of alternative signaling and/or communication protocols involving for example GPU 120 and network adapter 130, as well as additional components of a computing system (such as for example system 100) may be used in different embodiments of the invention—e.g. in order to ensure memory coherency in GPU 120 and/or prevent associated potential errors or failures.

In some embodiments of the invention, initiating a processing procedure of incoming data packets by GPU 120 may require for example first reading the received packets by some component of the system (e.g. system 100), which may be for example network adapter 130. By performing for example a read operation by network adapter 130 on incoming packets, e.g., right after they are received and stored in e.g. GPU memory 122, there may be no need to actively signal and/or notify GPU 120 that these packets require or do not require further processing actions and/or protocols or procedures (as noted herein, such signaling and/or notifications may be made in the prior art by using a CPU unit, which imposes additional workloads on that unit; embodiments of the present invention may thus allow avoiding such workloads in order to mitigate the CPU-associated bottleneck). It should be noted that alternative operations, such as modifying the contents of incoming packets by another component within for example system 100, or performing read operations by such components instead of by network adapter 130 may be used and/or included in other embodiments of the invention.

Embodiments of the invention may allow executing a GPU-initiated communication algorithm—which may be used, for instance, as part of a high-throughput 5G packet transmission protocol. In some embodiments, such algorithm may include:

a. Performing one or more of the following using CPU 110:
   i. Allocating dedicated memory buffers (such as SQ 215 and CQ) in GPU memory 122.
   ii. Registering or "patching" relevant memory segments in GPU memory 122 to CPU 110-compatible data plane libraries and/or network adapter 130 polling mode drivers (network adapter registers 132 may be "exposed"/updated in such manner, in accordance with some of the operations described herein), employing dedicated libraries and network protocols such as InfiniBand Verbs via general-purpose processing platforms such as the CUDA platform, and the like.
   iii. At predefined time intervals or timeslots, preparing or generating, for a set of packets, auxiliary information or metadata describing the state of a set of packets and/or descriptors (which may be, e.g., WQEs including scheduling instructions as described herein), such as for example the number of packets sent/received at a given timeslot, the number of descriptors associated with the packets, eCPRI header info, and initial timeslot timestamp—and storing them in CPU memory 115 and/or GPU memory 122.

b. Performing/executing a plurality of 5G signal processing, data production, and packet preparation procedures (such as, for instance: processing of PDSCHs, PDCCHs, PBCHs, etc.—via, for instance, a CUDA kernel making use of appropriate libraries such as Aerial 5G, and storing the output in a contiguous buffer of GPU memory), and indicate or flag the completion of such procedures by GPU 120.

c. Performing one of the following as part of a send operation by GPU 120:
   i. Cleaning/discarding/deleting packet descriptors that are no longer in use by, e.g., removing them from the SQ 215 or CQ.
   ii. Prepare SQ 215 for the next timeslot: e.g., populating it with or writing to it packet descriptors including appropriate scheduling instructions (e.g., wait-on-time/wait-on-data as disclosed herein).
   iii. Send prepared packets to a network adapter 130; trigger sending or transmission by updating its registers 132 as disclosed herein.
   iv. Perform additional auxiliary operations, such as pointing payload addresses associated with a plurality of packet or descriptors to appropriate offsets of a corresponding data buffer.

d. Performing one of the following as part of a send operation by a network adapter 130:
   i. Following the updating of network adapter registers 132 by GPU 120, reading packet descriptors from GPU memory 122 (e.g., from the SQ 215).
   ii. Transmitting packets according to scheduling instructions included in packet descriptors.

In some embodiments, operations (b)-(d) above may be performed concurrently or simultaneously, e.g., such that packets and/or descriptors are prepared and/or sent to network adapter 130 while signal processing and data production operations are being executed.

In some embodiments, the performing and/or executing of 5G signal processing, and/or data production, and/or packet preparation procedures by GPU 120 may include performing two or more independent, parallel procedures, for example in order to achieve desirable speed and/or scaling properties. For example, GPU 120 may execute a plurality of auxiliary operations required for preparation of packets and/or descriptors (which may be for example U-plane packets)—such as preparing and/or writing header information, payload pointers, and the like, as known in the art —in parallel to the preparation of packet payloads. In some embodiments, such parallel execution may involve waiting, as part of the auxiliary operations in execution, for the completion of packet payload preparation, or vice versa, before triggering the sending of packets from GPU memory 122 to network adapter 130.

Some embodiments of the invention may involve one or more drivers to ensure compatibility between different components of the system. In some embodiments, for instance, CPU/GPU physical or virtual memory addresses may be mapped to network adapter 130 using a dedicated driver. In some other embodiments, similar-purpose drivers may be used for mapping memory addresses from network adapter 130 to a processing unit (e.g., CPU 110 or GPU 120), or for mapping physical/virtual memory addresses from one processing unit to another, different processing unit, transmission device, or additional memory components. In some embodiments, a dedicated driver may enable persistent GPU mapping, where network adapter 130 may request access to GPU memory pages in a semi-permanent manner Such a feature may for example allow an access to GPU memory pages by network adapter 130 to hold valid even after a running process and/or application has terminated, while in previous solutions such access is revoked with process and/or application termination.

Figure 5:
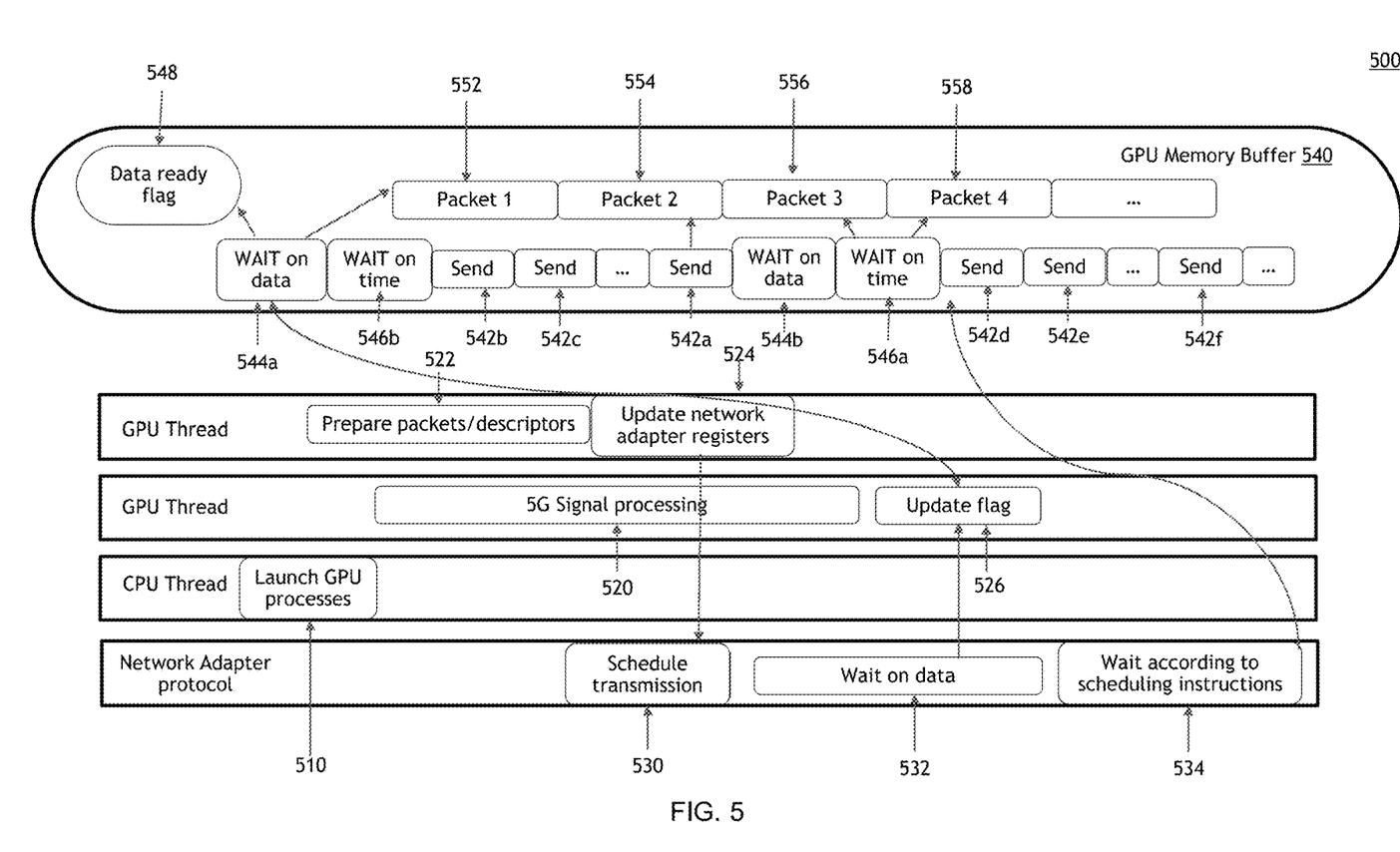
FIG. 5 is a flow diagram of an example algorithm for GPU-initiated communication over a 5G network which employs packet-descriptor-based scheduling instructions, in accordance with some embodiments of the present invention.

Reference is now made to FIG. 5, which illustrates an example algorithm for GPU-initiated communication over a 5G network which employs packet-descriptor-based scheduling instructions, in accordance with some embodiments of the present invention. While a 5G network is used as an example, other cellular networks, and other data networks, may be used. As in process 300 and 400, CPU 110 may initiate process 500 by launching (operation 510) 5G signal processing on GPU 120 (operation 520). GPU 120 may concurrently or simultaneously prepare packets and descriptors which may then be stored in a dedicated GPU memory 122 buffer 540 (operation 522) and may immediately send prepared packets and descriptors to network adapter 130 (operation 524) by updating its registers 132; network adapter 130 may then schedule the transmission of the packets received from GPU 120 (operation 530), taking scheduling instruction(s) included in packet descriptors into account. In the illustrated example, network adapter 130 may receive "send immediately", "wait on data", and "wait on time" scheduling instructions included in corresponding packet descriptors 542*a-f*, 544*a-b*, and 546*a-b*, respectively. Based on a "wait on data" instruction, network adapter 130 may wait (operation 532) for a "data ready" flag 548, which signifies the availability of required data based on which packet transmission is conditioned. In such case, GPU 120 may first have to update the corresponding flag (operation 526) in order to signal the required data has been made available/visible, and is included in a given GPU memory buffer 540. Once updated, network adapter 130 may proceed with transmitting the packets associated with the instruction—e.g., packet 552 in the particular example under consideration. Based on a "send immediately" instruction (e.g., associated with packet 554) network adapter 130 may schedule packet transmission at the earliest possible timeslot, without having to wait until particular data has been made available, or until a certain clock time is reached or measured. Based on a "wait on time" instruction, e.g., for packet 556 and packet 558, network adapter 130 may wait (operation 534) until a predefined time (e.g., UTC time X) is reached, and only then schedule or transmit these packets over network 250. Particular packet descriptors used in the present example are non-limiting: alterative descriptors, as well as their amount and queueing/ordering may differ in other embodiments of the invention.

Processing units (e.g., CPU 110 or GPU 120) and network adapter 130 may generally be configured to, e.g., trigger, stop, pause, wait for, or proceed with one or more packet-related procedures and protocols—which may include, e.g., packet preparation, packet descriptor preparation packet scheduling, transmission, and processing as disclosed herein—based on appropriate requests included in packets descriptors (including, but not limited to, wait-on-time and wait-on-data instructions) and/or in the packets themselves, which may be found and/or read by one or more of said units and adapter. It should be noted that while transmission of packets over a 5G network is used as a useful example, using GPU 120 for initiation and triggering of communication procedures by a separate component (such as network adapter 130) as described herein may also be used in different contexts, e.g., in parallel programming interfaces and GPU-accelerated libraries such as NCCL and NVSH-MEM™. Those skilled in the art would recognize that examples used in this case are non-limiting, and that embodiments of the invention may be utilized in additional, different contexts, and as part of various protocols and procedures.

Figure 6:
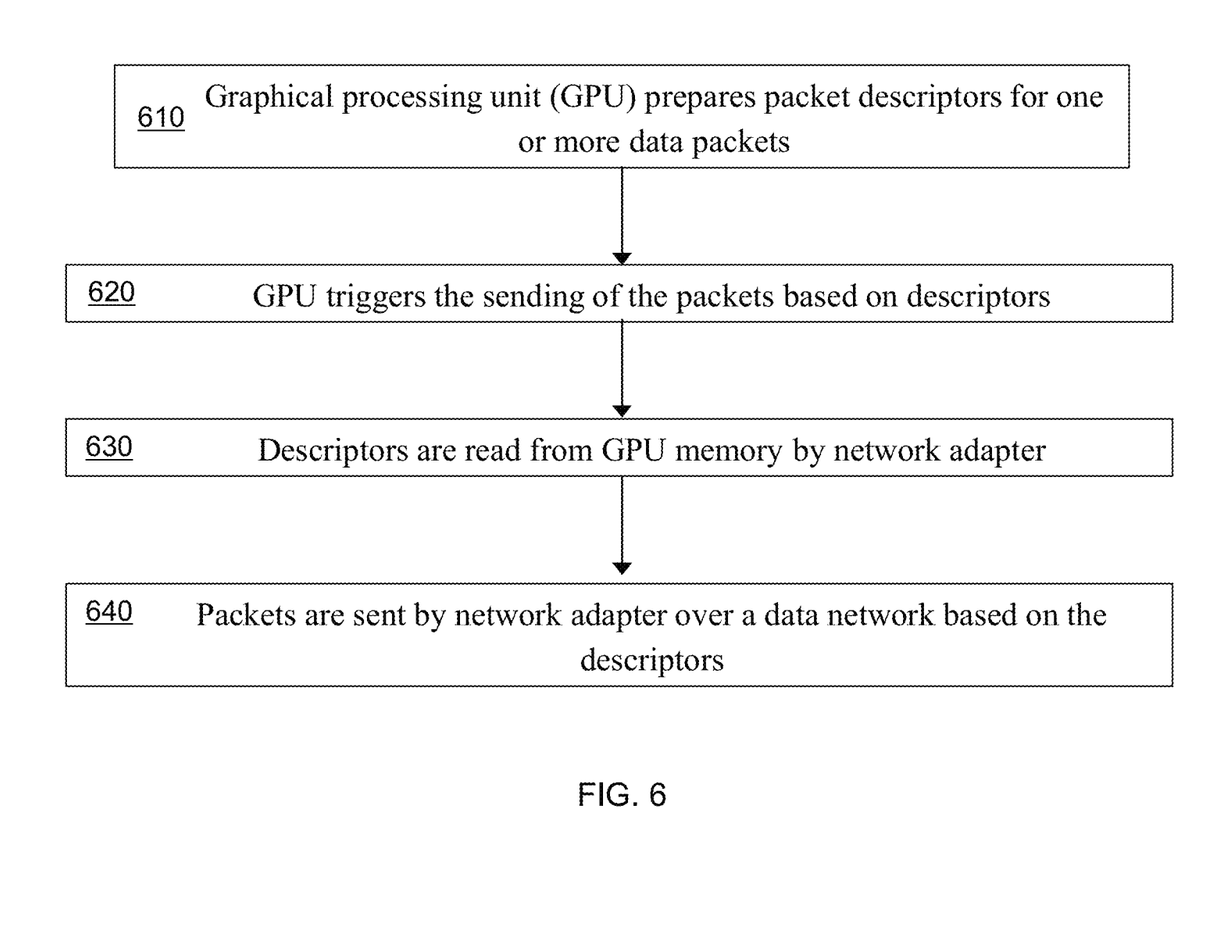
FIG. 6 is a flow diagram of a simple GPU-initiated communication process according to exemplary embodiments of the invention.

FIG. 6. is a flowchart depicting a simple GPU-initiated communication process in a computing system according to some embodiments of the present invention. In step 610, data packet descriptors for one or more data packets are prepared by GPU 120 as described herein. In step 620, GPU 120 triggers the sending of packets (which may correspond to, e.g., transmission by network adapter 130), based on prepared packet descriptors. In step 630, prepared packet descriptors are read from GPU memory 122 by network adapter 130. In step 640, packets are sent by network adapter 130 over data network 250 based on the descriptors as described herein.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In detailed description, some features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for graphical processing unit (GPU) initiated communication over a 5G data network, the method comprising:
   allocating, by a central processing unit (CPU), one or more memory buffers in GPU memory;
   initiating, by the CPU, preparation of one or more packets by the GPU;
   preparing, by the GPU, the one or more packets to be transmitted on the 5G data network based on one or more of the memory buffers in the GPU memory;
   preparing, by the GPU, one or more descriptors, each associated with a packet of for the one or more packets, wherein one or more of the descriptors comprise scheduling instructions for one or more of the packets;
   populating, by the GPU, one or more of the memory buffers with one or more of the descriptors; and
   triggering, by the GPU, sending of one or more of the packets by a network adapter over the 5G data network by the GPU updating registers of the network adapter, the sending based on the scheduling instructions included in one or more of the descriptors associated with one or more of the packets.

2. The method of claim 1, wherein the sending of one or more of the packets comprises reading, by the network adapter, one or more of the descriptors and the packets from the GPU memory.

3. The method of claim 1, comprising generating, by the CPU, metadata describing a state of one or more of the packets and descriptors at predefined timeslots.

4. The method of claim 1, wherein the preparing of the one or more descriptors and the triggering of the sending of one or more of the packets are performed simultaneously.

5. The method of claim 1, comprising flagging, by the GPU, a completion of at least one of: the preparing of one or more descriptors and the triggering of the sending of one or more of the packets.

6. The method of claim 2, comprising receiving, by the GPU, one or more incoming packets and storing the incoming packets in the GPU memory; and
performing, by the network adapter, a read operation on the incoming packets to initiate at least one 5G signal processing procedure on the incoming packets by the GPU, wherein the at least one 5G signal processing procedure is selected from the list consisting of: processing of physical downlink shared channels (PDSCHs), processing of physical downlink control channels (PDCCHs) and processing of physical broadcast channel (PBCHs).

7. The method of claim 1, comprising removing, by the GPU, one or more unused descriptors from one or more of the GPU memory buffers.

8. The method of claim 1, comprising pointing, by the GPU, one or more payload addresses associated with at least one of the packets and the descriptors to one or more offsets of at least one of the memory buffers.

9. The method of claim 1, wherein the scheduling instructions comprise the instruction do not send until one or more of the packets include predefined data.

10. A system comprising:
a memory;
a network adapter; and
a central processing unit (CPU) and a graphical processing unit (GPU) to:
allocate, by the CPU, one or more memory buffers in GPU memory;
initiate, by the CPU, preparation of one or more packets by the GPU;
prepare, by the GPU, one or more packets to be transmitted on the 5G data network based on one or more of the memory buffers in the GPU memory;
prepare, by the GPU, one or more descriptors, each associated with a packet of the one or more packets, wherein one or more of the descriptors comprise scheduling instructions for one or more of the packets;
populate, by the GPU, one or more of the memory buffers with one or more of the descriptors; and
trigger, by the GPU, sending of one or more of the packets by a network adapter over the 5G data network by the GPU updating registers of the network adapter, the sending based on the scheduling instructions included in one or more of the descriptors associated with the one or more of the packets.

11. The system of claim 10, further comprising:
the network adapter;
wherein the network adapter is to read one or more of the descriptors and the packets from the GPU memory.

12. The system of claim 10, wherein one or more of the CPUs is to generate metadata describing a state of one or more of the packets and descriptors at predefined timeslots.

13. The system of claim 10, wherein one or more of the GPUs is to perform at least one of: the preparing of the one or more; the preparing of the one or more descriptors.

14. The system of claim 10, wherein one or more of the GPUs is to flag a completion of at least one of: the preparing of one or more descriptors; and the triggering of the sending of the one or more of the packets.

15. The system of claim 10, wherein one or more of the GPUs is to receive one or more incoming packets and store the incoming packets in the GPU memory; and
wherein the network adapter is to perform a read operation on the incoming packets to initiate at least one 5G signal processing procedure on the incoming packets by the GPU, wherein the at least one 5G signal processing procedure is selected from the list consisting of: processing of physical downlink shared channels (PDSCHS), processing of physical downlink control channels (PDCCHs) and processing of physical broadcast channel (PBCHs).

16. The system of claim 10, wherein one or more of the GPUs is to remove one or more unused descriptors from one or more of the GPU memory buffers.

17. The system of claim 10, wherein one or more of the GPUs is to point one or more payload addresses associated with at least one of the packets and the descriptors to one or more offsets of at least one of the memory buffers.

18. The system of claim 10, wherein the scheduling instructions comprise the instruction do not send until one or more of the packets include predefined data.

* * * * *